United States Patent
Wittkopp et al.

(10) Patent No.: US 8,113,984 B2
(45) Date of Patent: Feb. 14, 2012

(54) 8-SPEED TRANSMISSIONS

(75) Inventors: Scott H. Wittkopp, Ypsilanti, MI (US);
Andrew W. Phillips, Rochester, MI (US); James M. Hart, Belleville, MI (US); Clinton E. Carey, Highland, MI (US)

(73) Assignee: GM Global Technology Operations LLC, Detroit, MI (US)

(*) Notice: Subject to any disclaimer, the term of this patent is extended or adjusted under 35 U.S.C. 154(b) by 425 days.

(21) Appl. No.: 12/351,899

(22) Filed: Jan. 12, 2009

(65) Prior Publication Data

US 2010/0179020 A1 Jul. 15, 2010

(51) Int. Cl.
*F16H 3/62* (2006.01)

(52) U.S. Cl. .................................................. 475/276

(58) Field of Classification Search .................. 475/275, 475/276, 296, 330
See application file for complete search history.

(56) References Cited

U.S. PATENT DOCUMENTS

| | | | |
|---|---|---|---|
| 4,070,927 A | 1/1978 | Polak |
| 4,709,594 A | 12/1987 | Maeda |
| 5,106,352 A | 4/1992 | Lepelletier |
| 5,385,064 A | 1/1995 | Reece |
| 5,497,867 A | 3/1996 | Hirsch et al. |
| 5,560,461 A | 10/1996 | Loeffler |
| 5,599,251 A | 2/1997 | Beim et al. |
| 5,641,045 A | 6/1997 | Ogawa et al. |
| 5,651,435 A | 7/1997 | Perosky et al. |
| 5,975,263 A | 11/1999 | Forsyth |
| 6,053,839 A | 4/2000 | Baldwin et al. |
| 6,071,208 A | 6/2000 | Koivunen |
| 6,083,135 A | 7/2000 | Baldwin et al. |
| 6,217,474 B1 | 4/2001 | Ross et al. |
| 6,354,416 B1 | 3/2002 | Eo |
| 6,375,592 B1 | 4/2002 | Takahashi et al. |
| 6,422,969 B1 | 7/2002 | Raghavan et al. |
| 6,425,841 B1 | 7/2002 | Haka |
| 6,471,615 B1 | 10/2002 | Naraki et al. |
| 6,558,287 B2 | 5/2003 | Hayabuchi et al. |
| 6,623,397 B1 | 9/2003 | Raghavan et al. |
| 6,840,885 B2 | 1/2005 | Yi et al. |
| 6,945,900 B2 * | 9/2005 | Usoro et al. .................. 475/276 |
| 6,962,548 B2 * | 11/2005 | Bucknor et al. .............. 475/276 |
| 6,988,972 B2 * | 1/2006 | Usoro et al. .................. 475/275 |
| 6,997,844 B2 * | 2/2006 | Bucknor et al. .............. 475/275 |
| 7,090,610 B2 * | 8/2006 | Usoro et al. .................. 475/276 |
| 2010/0311536 A1 * | 12/2010 | Aota et al. .................... 475/275 |

FOREIGN PATENT DOCUMENTS

JP 09-126283 5/1997

* cited by examiner

*Primary Examiner* — Justin Holmes
*Assistant Examiner* — Michael Gonzalez
(74) *Attorney, Agent, or Firm* — Quinn Law Group, PLLC

(57) ABSTRACT

The transmission has a plurality of members that can be utilized in powertrains to provide at least eight forward speed ratios and one reverse speed ratio. The transmission includes three planetary gear sets, six torque-transmitting devices, and three fixed interconnections. The powertrain includes an engine and torque converter that is continuously connected to one of the planetary gear members and an output member that is continuously connected with another one of the planetary gear members. The six torque-transmitting devices provide interconnections between various gear members, and the transmission housing, and are operated in combinations of two to establish at least eight forward speed ratios and one reverse speed ratio.

19 Claims, 11 Drawing Sheets

| GEAR STATE | GEAR RATIO | RATIO STEP | 280 | 282 | 284 | 285 | 286 | 287 |
|---|---|---|---|---|---|---|---|---|
| REV | -1.800 | | | X | | | X | |
| N | | -0.38 | | | | | | |
| 1st | 4.770 | | X | X | | | | |
| 2nd | 2.949 | 1.62 | X | X | | | | |
| 3rd | 2.261 | 1.30 | X | | X | | | |
| 4th | 1.747 | 1.29 | X | | | | | X |
| 5th | 1.359 | 1.29 | | | | X | | |
| 6th | 1.000 | 1.36 | | | X | X | | |
| 7th | 0.726 | 1.38 | | X | | X | X | |
| 8th | 0.630 | 1.15 | | | | X | X | |

| GEAR STATE | GEAR RATIO | RATIO STEP | 480 | 482 | 484 | 485 | 486 | 487 |
|---|---|---|---|---|---|---|---|---|
| REV | -1.800 |  |  | X |  |  | X |  |
| N |  | -0.38 |  |  |  |  |  |  |
| 1st | 4.770 | 1.62 | X | X |  |  |  |  |
| 2nd | 2.949 | 1.30 | X |  |  |  |  |  |
| 3rd | 2.261 | 1.29 | X |  | X |  |  |  |
| 4th | 1.747 | 1.29 | X |  |  |  |  | X |
| 5th | 1.359 | 1.36 |  |  |  | X |  |  |
| 6th | 1.000 | 1.38 |  |  | X | X |  |  |
| 7th | 0.726 | 1.15 |  | X |  | X | X |  |
| 8th | 0.630 |  |  |  |  |  |  |  |

| GEAR STATE | GEAR RATIO | RATIO STEP | 580 | 582 | 584 | 585 | 586 | 587 |
|---|---|---|---|---|---|---|---|---|
| REV | -1.800 | | | X | | | | X |
| N | | -0.38 | | | | | | |
| 1st | 4.770 | | X | X | | | | |
| 2nd | 2.949 | 1.62 | X | | X | | | |
| 3rd | 2.261 | 1.30 | X | | | | | X |
| 4th | 1.747 | 1.29 | X | | | X | | |
| 5th | 1.359 | 1.29 | | | | X | X | |
| 6th | 1.000 | 1.36 | | X | | X | | |
| 7th | 0.726 | 1.38 | | | X | | X | |
| 8th | 0.630 | 1.15 | | | | X | | X |

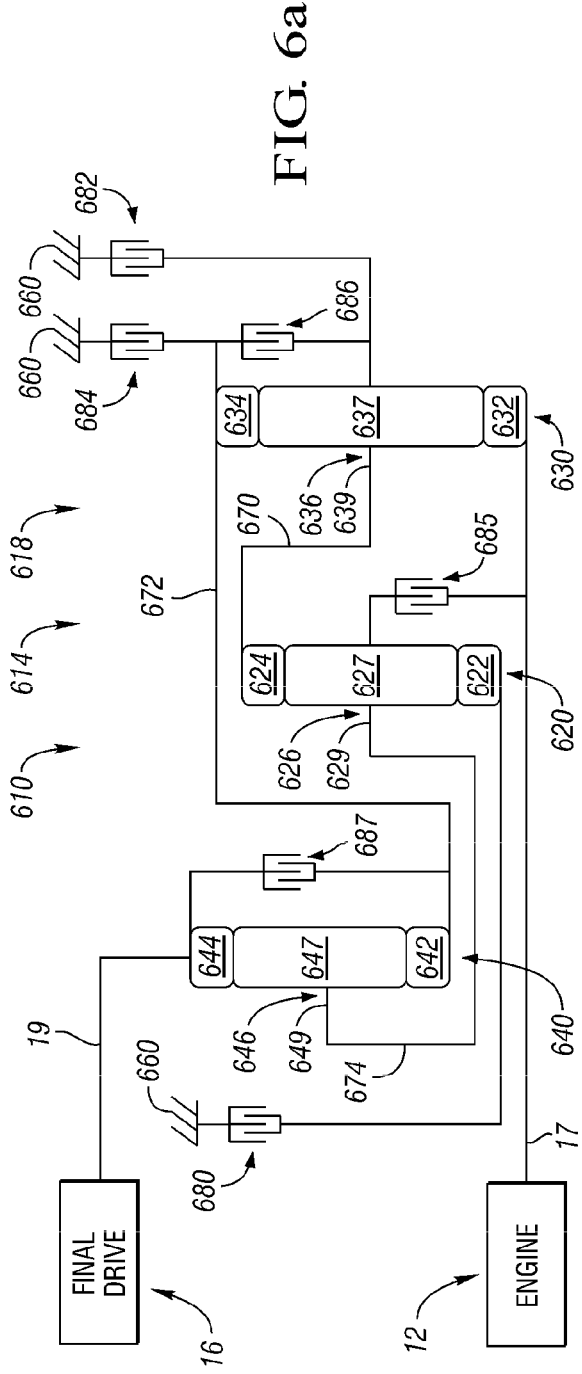

8-SPEED TRANSMISSIONS

TECHNICAL FIELD

The present invention relates to a power transmission having three planetary gear sets that are controlled by six torque-transmitting devices to provide at least eight forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-, eight-, nine- and ten-speed transmissions provide further improvements in acceleration and fuel economy over six-speed transmissions. However, like the six-speed transmissions discussed above, the development of seven-, eight-, nine- and ten-speed transmissions has been precluded because of complexity, size and cost.

SUMMARY OF THE INVENTION

It is an object of the present invention to provide an improved transmission having three planetary gear sets controlled to provide at least eight forward speed ratios and one reverse speed ratio.

The transmission family of the present invention has three planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the third member of the first planetary gear set with the second or third member of second planetary gear set.

A second interconnecting member continuously connects the first or third member of the second planetary gear set with the first member of the third planetary gear set.

A third interconnecting member continuously connects the first or second member of the first planetary gear set with the second member of the third planetary gear set.

The input member is continuously connected with the first member of the first or second planetary gear set. The output member is continuously connected with the third member of the third planetary gear set or with the second member of the second planetary gear set.

A first torque-transmitting device, such as a brake, selectively connects the first or second member of the first planetary gear set with a stationary member (transmission housing/casing).

A second torque-transmitting device, such as a brake, selectively connects the third member of the first planetary gear set with a stationary member (transmission housing/casing).

A third torque-transmitting device, such as a brake, selectively connects the first or third member of the second planetary gear set with a stationary member (transmission housing/casing).

A fourth torque-transmitting device, such as a clutch, selectively connects the second member of the first planetary gear set with the first member of the second planetary gear set or with the third member of the third planetary gear set.

A fifth torque-transmitting device, such as a clutch, selectively connects the second or third member of the first planetary gear set with the first or third member of the second planetary gear set or with the third member of the third planetary gear set.

A sixth torque-transmitting device, such as a clutch, selectively connects a member of the second planetary gear set with the third member of the first or third planetary gear set.

The six torque-transmitting devices are selectively engageable in combinations of two to yield at least eight forward speed ratios and one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWING

FIG. 1a is a schematic representation of a powertrain including a planetary transmission in accordance with the present invention;

FIG. 1b is a truth table and chart depicting some of the operating characteristics of the powertrain shown in FIG. 1a;

FIG. 2a is a schematic representation of a powertrain including a planetary transmission incorporating another family member of the present invention;

FIG. 2b is a truth table and chart depicting some of the operating characteristics of the powertrain shown in FIG. 2a;

FIG. 3a is a schematic representation of a powertrain including a planetary transmission incorporating another family member of the present invention;

FIG. 3b is a truth table and chart depicting some of the operating characteristics of the powertrain shown in FIG. 3a;

FIG. 4a is a schematic representation of a powertrain including a planetary transmission incorporating another family member of the present invention;

FIG. 4b is a truth table and chart depicting some of the operating characteristics of the powertrain shown in FIG. 4a;

FIG. 5a is a schematic representation of a powertrain including a planetary transmission incorporating another family member of the present invention;

FIG. 5b is a truth table and chart depicting some of the operating characteristics of the powertrain shown in FIG. 5a;

FIG. 6a is a schematic representation of a powertrain including a planetary transmission incorporating another family member of the present invention;

FIG. 6b is a truth table and chart depicting some of the operating characteristics of the powertrain shown in FIG. 6a;

FIG. 7a is a schematic representation of a powertrain including a planetary transmission incorporating another family member of the present invention;

FIG. 7b is a truth table and chart depicting some of the operating characteristics of the powertrain shown in FIG. 7a.

DESCRIPTION OF THE PREFERRED EMBODIMENT

Figures 1A, 1B:
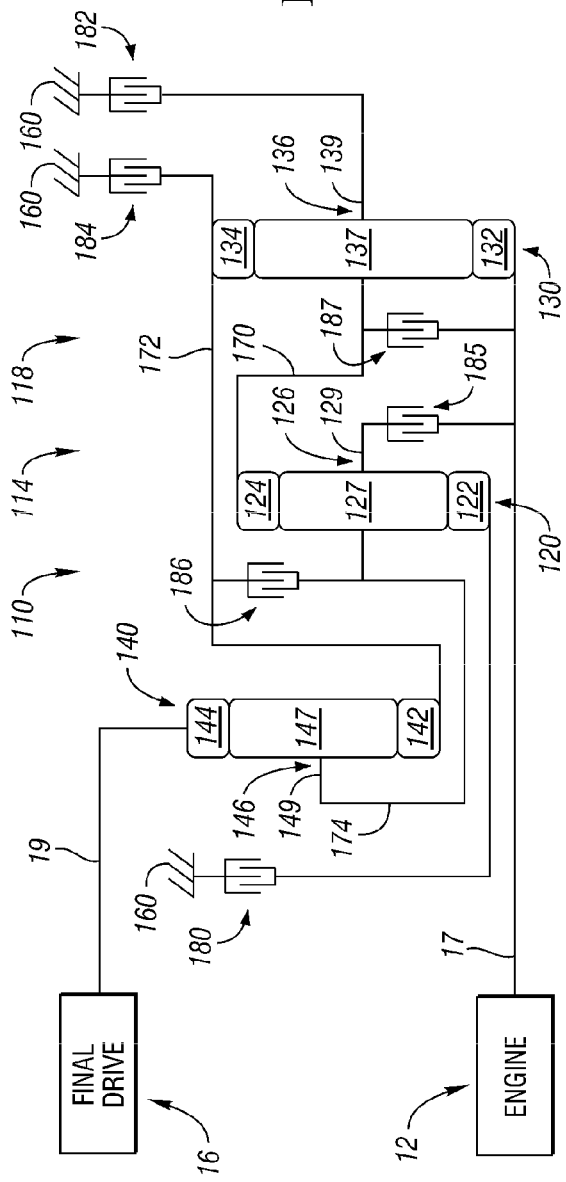

Referring to the drawings, there is shown in FIG. 1a a powertrain 110 having a conventional engine and torque converter 12, a planetary transmission 114, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 114 includes an input member 17 continuously connected with the engine 12, a planetary gear arrangement 118, and an output member 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear members 132 and the ring gear member 134.

The planetary gear set 140 includes a sun gear member 142, a ring gear member 144, and a planet carrier assembly member 146. The planet carrier assembly member 146 includes a plurality of pinion gears 147 mounted on a carrier member 149 and disposed in meshing relationship with both the ring gear member 144 and the sun gear member 142.

The planetary gear arrangement also includes six torque-transmitting devices 180, 182, 184, 185, 186 and 187. The torque-transmitting devices 180, 182 and 184 are stationary-type torque-transmitting devices, commonly termed brakes or reaction clutches. The torque-transmitting devices 185, 186 and 187 are rotating-type torque-transmitting devices, commonly termed clutches.

The input member 17 is continuously connected with the sun gear member 132 of the planetary gear set 130. The output member 19 is continuously connected with the ring gear member 144 of the planetary gear set 140.

A first interconnecting member 170 continuously connects the ring gear member 124 of the planetary gear set 120 with the planet carrier assembly member 136 of the planetary gear set 130. A second interconnecting member 172 continuously connects the ring gear member 134 of the planetary gear set 130 with the sun gear member 142 of the planetary gear set 140. A third interconnecting member 174 continuously connects the planet carrier assembly member 126 of the planetary gear set 120 with the planet carrier assembly member 146 of the planetary gear set 140.

A first torque-transmitting device, such as brake 180, selectively connects the sun gear member 122 of the planetary gear set 120 with the transmission housing 160. A second torque-transmitting device, such as a brake 182, selectively connects the ring gear member 124 of the planetary gear set 120 and the planet carrier assembly member 136 of the planetary gear set 130 via interconnecting member 170 with the transmission housing 160. A third torque-transmitting device, such as brake 184, selectively connects the ring gear member 134 of the planetary gear set 130 and sun gear member 142 of the planetary gear set 140 via interconnecting member 172 with the transmission housing 160. A fourth torque-transmitting device, such as clutch 185, selectively connects the planet carrier assembly member 126 of the planetary gear set 120 and planet carrier assembly member 146 of the planetary gear set 140 via interconnecting member 174 with the sun gear member 132 of the planetary gear set 130. A fifth torque-transmitting device, such as clutch 186, selectively connects the planet carrier assembly member 126 of the planetary gear set 120 and planet carrier assembly member 146 of the planetary gear set 140 via interconnecting member 174 with the ring gear member 134 of the planetary gear set 130 and sun gear member 142 of the planetary gear set 140 via interconnecting member 172. A sixth torque-transmitting device, such as clutch 187, selectively connects the ring gear member 124 of the planetary gear set 120 and planet carrier assembly member 136 of the planetary gear set 130 via interconnecting member 170 with the sun gear member 132 of the planetary gear set 130.

As shown in FIG. 1b, and in particular the truth table disclosed therein, the torque-transmitting devices are selectively engaged in combinations of two to provide eight forward speed ratios and one reverse speed ratio, all with single transition sequential shifts with two overdrive ratios.

As set forth above, the engagement schedule for the torque-transmitting devices is shown in the truth table of FIG. 1b. The chart of FIG. 1b describes the ratio steps that are attained in the above described transmission. For example, the step ratio between the first and second forward speed ratios is 1.62, while the step ratio between the reverse speed ratio and first forward ratio is −0.38.

Figure 1C:
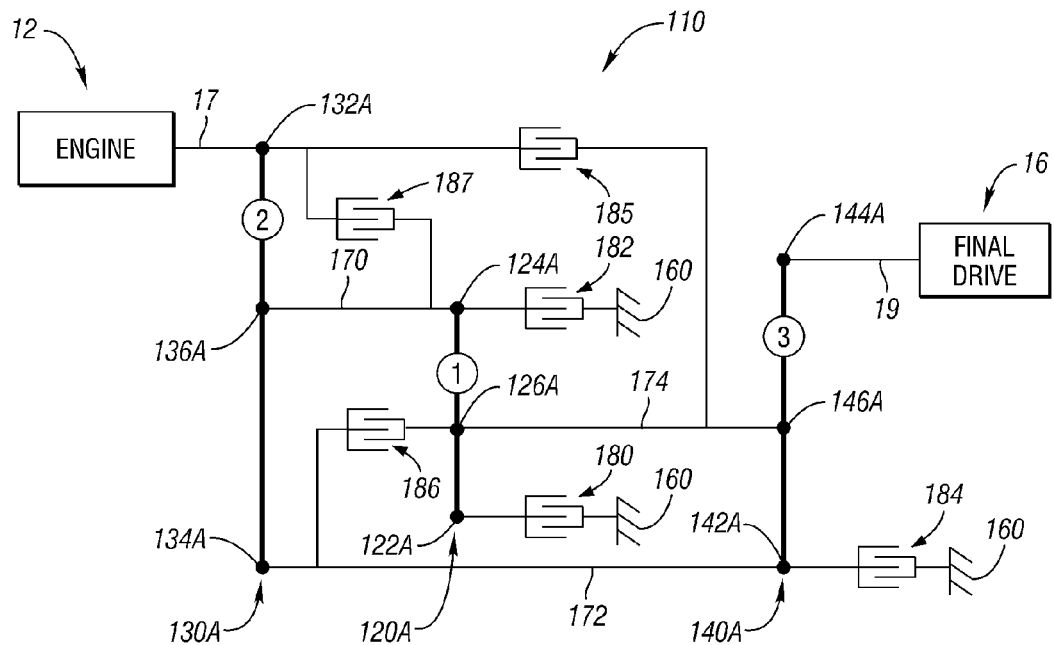
FIG. 1c is a schematic representation of the powertrain of FIG. 1a depicted in lever diagram form.

Referring to FIG. 1c, the embodiment of powertrain 110 depicted in FIG. 1a is illustrated in a lever diagram format. A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

The powertrain 110 includes an input member 17 continuously connected with the engine 12, an output member 19 continuously connected with the final drive mechanism 16, a first planetary gear set 120A having three nodes: a first node 122A, a second node 126A and a third node 124A; a second planetary gear set 130A having three nodes: a first node 132A, a second node 136A and a third node 134A; and a third planetary gear set 140A having three nodes: a first node 142A, a second node 146A and a third node 144A.

The input member 17 is continuously connected with the node 132A. The output member 19 is continuously connected with the node 144A.

The node 124A is continuously connected with node 136A via interconnecting member 170. The node 134A is continuously connected with the node 142A via interconnecting member 172. The node 126A is continuously connected with the node 146A via interconnecting member 174.

A first torque-transmitting device, such as brake 180, selectively connects the node 122A with the transmission housing 160. A second torque-transmitting device, such as brake 182, selectively connects the nodes 124A and 136A via interconnecting member 170 with the transmission housing 160. A third torque-transmitting device, such as brake 184, selectively connects the nodes 134A and 142A via interconnecting member 172 with the transmission housing 160. A fourth torque-transmitting device, such as clutch 185, selectively connects the nodes 126A and 146A via interconnecting member 174 with the node 132A. A fifth torque-transmitting device, such as clutch 186, selectively connects the nodes 126A and 146A via interconnecting member 174 with the nodes 134A and 142A via interconnecting member 172. A sixth torque-transmitting device, such as clutch 187, selectively connects the nodes 124A and 136A via interconnecting member 170 with the node 132A.

To establish ratios, two torque-transmitting devices are engaged for each gear state. The engaged torque-transmitting devices are represented by an "X" in each respective row of FIG. 1b. For example, to establish reverse gear, the brake 182 and clutch 186 are engaged. The brake 182 engages the nodes 124A and 136A with the transmission housing 160. The clutch 186 engages the nodes 126A and 146A with the nodes 134A and 142A. Likewise, the eight forward ratios are achieved through different combinations of clutch engagement as per FIG. 1b.

The powertrain 110 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

Description of a Second Exemplary Embodiment

Figure 2C:
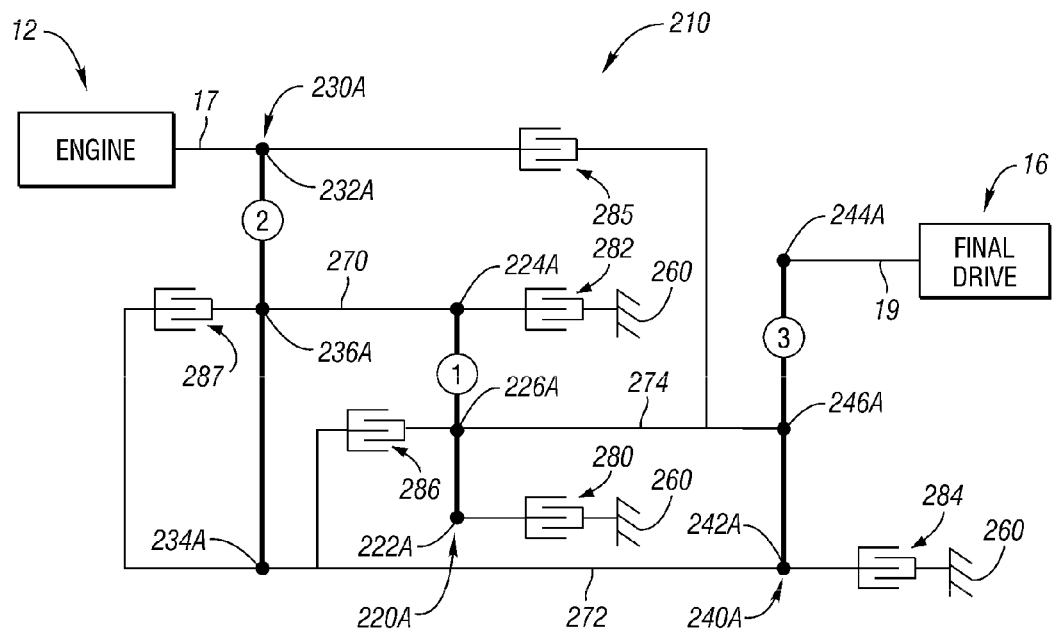
FIG. 2c is a schematic representation of the powertrain of FIG. 2a depicted in lever diagram form.
Figures 2A, 2B:
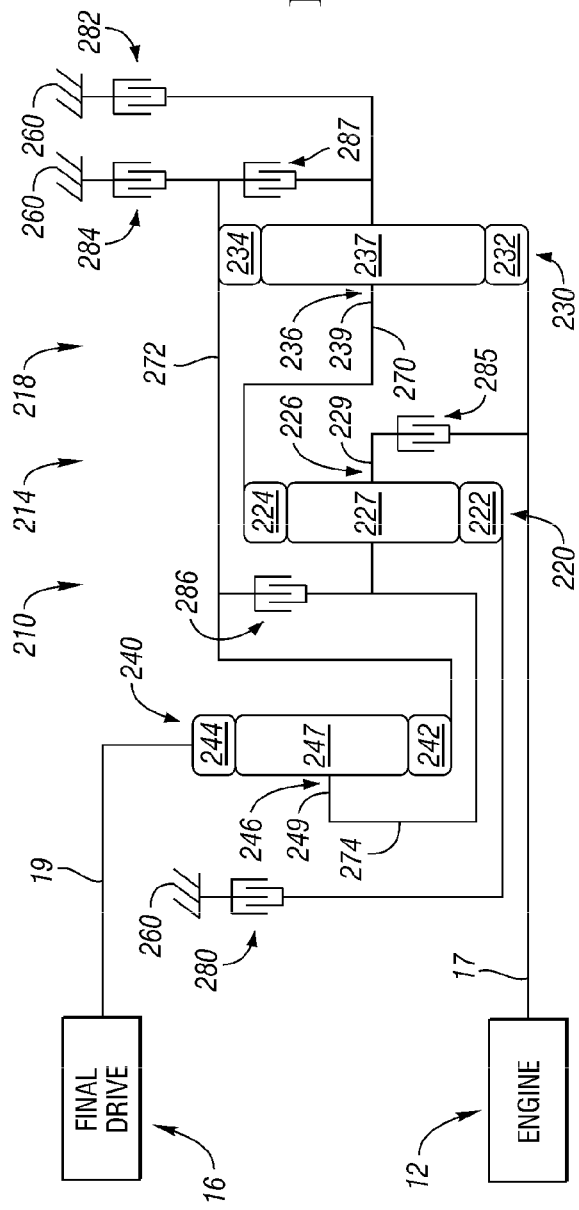

In FIG. 2a a powertrain 210 is shown having a conventional engine and torque converter 12, a planetary transmission 214, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 214 includes an input member 17 continuously connected with the engine 12, a planetary gear arrangement 218, and an output member 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear members 232 and the ring gear member 234.

The planetary gear set 240 includes a sun gear member 242, a ring gear member 244, and a planet carrier assembly member 246. The planet carrier assembly member 246 includes a plurality of pinion gears 247 mounted on a carrier member 249 and disposed in meshing relationship with both the ring gear member 244 and the sun gear member 242.

The planetary gear arrangement also includes six torque-transmitting devices 280, 282, 284, 285, 286 and 287. The torque-transmitting devices 280, 282 and 284 are stationary-type torque-transmitting devices, commonly termed brakes or reaction clutches. The torque-transmitting devices 285, 286 and 287 are rotating-type torque-transmitting devices, commonly termed clutches.

The input member 17 is continuously connected with the sun gear member 232 of the planetary gear set 230. The output member 19 is continuously connected with the ring gear member 244 of the planetary gear set 240.

A first interconnecting member 270 continuously connects the ring gear member 224 of the planetary gear set 220 with the planet carrier assembly member 236 of the planetary gear set 230. A second interconnecting member 272 continuously connects the ring gear member 234 of the planetary gear set 230 with the sun gear member 242 of the planetary gear set 240. A third interconnecting member 274 continuously connects the planet carrier assembly member 226 of the planetary gear set 220 with the planet carrier assembly member 246 of the planetary gear set 240.

A first torque-transmitting device, such as brake 280, selectively connects the sun gear member 222 of the planetary gear set 220 with the transmission housing 260. A second torque-transmitting device, such as brake 282, selectively connects the ring gear member 224 of the planetary gear set 220 and planet carrier assembly member 236 of the planetary gear set 230 via interconnecting member 270 with the transmission housing 260. A third torque-transmitting device, such as brake 284, selectively connects the ring gear member 234 of the planetary gear set 230 and sun gear member 242 of the planetary gear set 240 via interconnecting member 272 with the transmission housing 260. A fourth torque-transmitting device, such as clutch 285, selectively connects the planet carrier assembly member 226 of the planetary gear set 220 and planet carrier assembly member 246 of the planetary gear set 240 via interconnecting member 274 with the sun gear member 232 of the planetary gear set 230. A fifth torque-transmitting device, such as clutch 286, selectively connects the planet carrier assembly member 226 of the planetary gear set 220 and planet carrier assembly member 246 of the planetary gear set 240 via interconnecting member 274 with the ring gear member 234 of the planetary gear set 230 and sun gear member 242 of the planetary gear set 240 via interconnecting member 272. A sixth torque-transmitting device, such as clutch 287, selectively connects the ring gear member 224 of the planetary gear set 220 and planet carrier assembly member 236 of the planetary gear set 230 via interconnecting member 270 with the ring gear member 234 of the planetary gear set 230 and sun gear member 242 of the planetary gear set 240 via interconnecting member 272.

As shown in FIG. 2b, and in particular the truth table disclosed therein, the torque-transmitting devices are selectively engaged in combinations of two to provide eight forward speed ratios and one reverse speed ratio, all with single transition sequential shifts and having two overdrive ratios.

As set forth above, the engagement schedule for the torque-transmitting devices is shown in the truth table of FIG. 2b. The chart of FIG. 2b describes the ratio steps that are attained in the above described transmission. For example, the step ratio between the first and second forward speed ratios is 1.62, while the step ratio between the reverse speed ratio and first forward ratio is −0.38.

Referring to FIG. 2c, the embodiment of powertrain 210 depicted in FIG. 2a is illustrated in a lever diagram format. The powertrain 210 includes an input member 17 continuously connected with the engine 12, an output member 19 continuously connected with the final drive mechanism 16, a first planetary gear set 220A having three nodes: a first node 222A, a second node 226A and a third node 224A; a second planetary gear set 230A having three nodes: a first node 232A, a second node 236A and a third node 234A; and a third planetary gear set 240A having three nodes: a first node 242A, a second node 246A and a third node 244A.

The input member 17 is continuously connected with the node 232A. The output member 19 is continuously connected with the node 244A.

The node 224A is continuously connected with node 236A via interconnecting member 270. The node 234A is continuously connected with the node 242A via interconnecting member 272. The node 226A is continuously connected with the node 246A via interconnecting member 274.

A first torque-transmitting device, such as brake 280, selectively connects the node 222A with the transmission housing 260. A second torque-transmitting device, such as brake 282, selectively connects the nodes 224A and 236A via interconnecting member 270 with the transmission housing 260. A third torque-transmitting device, such as brake 284, selectively connects the nodes 234A and 242A via interconnecting member 272 with the transmission housing 260. A fourth torque-transmitting device, such as clutch 285, selectively connects the nodes 226A and 246A via interconnecting member 274 with the node 232A. A fifth torque-transmitting device, such as clutch 286, selectively connects the nodes 226A and 246A via interconnecting member 274 with the nodes 234A and 242A via interconnecting member 272. A sixth torque-transmitting device, such as clutch 287, selectively connects the nodes 224A and 236A via interconnecting member 270 with the nodes 234A and 242A via interconnecting member 272.

To establish ratios, two torque-transmitting devices are engaged for each gear state. The engaged torque-transmitting devices are represented by an "X" in each respective row of FIG. 2b. For example, to establish reverse gear, the brake 282 and clutch 286 are engaged. The brake 282 engages the nodes 224A and 236A with the transmission housing 260. The clutch 286 engages the nodes 226A and 246A with the nodes 234A and 242A. Likewise, the eight forward ratios are achieved through different combinations of clutch engagement as per FIG. 2b.

Description of a Third Exemplary Embodiment

Figures 3A, 3B:
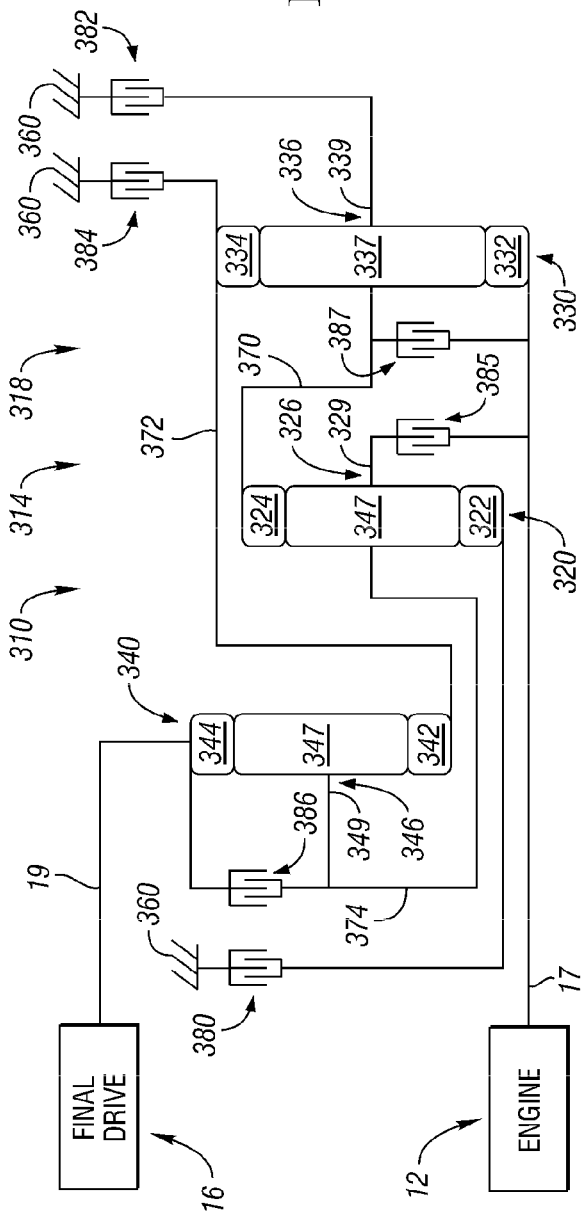

In FIG. 3a a powertrain 310 is shown having a conventional engine and torque converter 12, a planetary transmission 314, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 314 includes an input member 17 continuously connected with the engine 12, a planetary gear arrangement 318, and an output member 19 continuously connected with the final drive mechanism 16. The planetary gear arrangement 318 includes three planetary gear sets 320, 330 and 340.

The planetary gear set 320 includes a sun gear member 322, a ring gear member 324 and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear members 332 and the ring gear member 334.

The planetary gear set 340 includes a sun gear member 342, a ring gear member 344, and a planet carrier assembly member 346. The planet carrier assembly member 346 includes a plurality of pinion gears 347 mounted on a carrier member 349 and disposed in meshing relationship with both the ring gear member 344 and the sun gear member 342.

The planetary gear arrangement also includes six torque-transmitting devices 380, 382, 384, 385, 386 and 387. The torque-transmitting devices 380, 382 and 384 are stationary-type torque-transmitting devices, commonly termed brakes or reaction clutches. The torque-transmitting devices 385, 386 and 387 are rotating-type torque-transmitting devices, commonly termed clutches.

The input member 17 is continuously connected with the sun gear member 332 of the planetary gear set 330. The output member 19 is continuously connected with the ring gear member 344 of the planetary gear set 340.

A first interconnecting member 370 continuously connects the ring gear member 324 of the planetary gear set 320 with the planet carrier assembly member 336 of the planetary gear set 330. A second interconnecting member 372 continuously connects the ring gear member 334 of the planetary gear set 330 with the sun gear member 342 of the planetary gear set 340. A third interconnecting member 374 continuously connects the planet carrier assembly member 326 of the planetary gear set 320 with the planet carrier assembly member 346 of the planetary gear set 340.

A first torque-transmitting device, such as brake 380, selectively connects the sun gear member 322 of the planetary gear set 320 with the transmission housing 360. A second torque-transmitting device, such as brake 382, selectively connects the ring gear member 324 of the planetary gear set 320 and planet carrier assembly member 336 of the planetary gear set 330 via interconnecting member 370 with the transmission housing 360. A third torque-transmitting device, such as brake 384, selectively connects the ring gear member 334 of the planetary gear set 340 and sun gear member 342 of the planetary gear set 340 via interconnecting member 372 with the transmission housing 360. A fourth torque-transmitting device, such as clutch 385, selectively connects the planet carrier assembly member 326 of the planetary gear set 320 and planet carrier assembly member 346 of the planetary gear set 340 via interconnecting member 374 with the sun gear member 332 of the planetary gear set 320. A fifth torque-transmitting device, such as clutch 386, selectively connects the planet carrier assembly member 326 of the planetary gear set 320 and planet carrier assembly member 346 of the planetary gear set 340 via interconnecting member 374 with the ring gear member 344 of the planetary gear set 340. A sixth torque-transmitting device, such as clutch 387, selectively connects the ring gear member 324 of the planetary gear set 320 and the planet carrier assembly member 336 of the planetary gear set 330 via interconnecting member 370 with the sun gear member 332 of the planetary gear set 320.

As shown in FIG. 3b, and in particular the truth table disclosed therein, the torque-transmitting devices are selectively engaged in combinations of two to provide eight forward speed ratios and one reverse speed ratio, all with single transition sequential shifts and having two overdrive ratios.

As set forth above, the engagement schedule for the torque-transmitting devices is shown in the truth table of FIG. 3b. The chart of FIG. 3b describes the ratio steps that are attained in the above described transmission. For example, the step ratio between the first and second forward speed ratios is 1.62, while the step ratio between the reverse speed ratio and first forward ratio is −0.38.

Figure 3C:
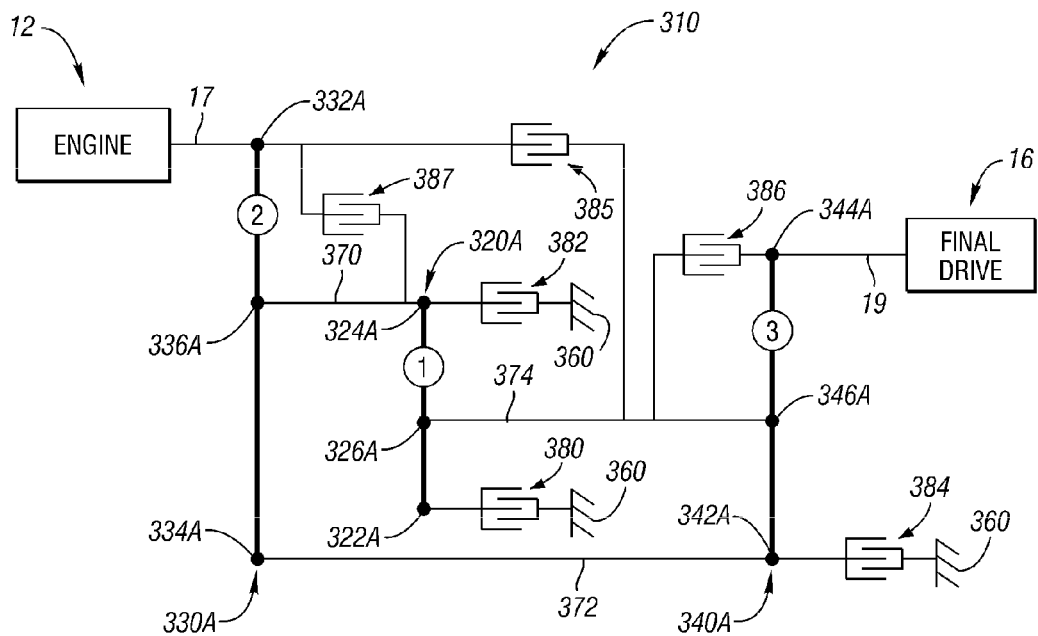
FIG. 3c is a schematic representation of the powertrain of FIG. 3a depicted in lever diagram form.

Referring to FIG. 3c, the embodiment of powertrain 310 depicted in FIG. 3a is illustrated in a lever diagram format. The powertrain 310 includes an input member 17 continuously connected with the engine 12, an output member 19 continuously connected with the final drive mechanism 16, a first planetary gear set 320A having three nodes: a first node 322A, a second node 326A and a third node 324A; a second planetary gear set 330A having three nodes: a first node 332A, a second node 336A and a third node 334A; and a third planetary gear set 340A having three nodes: a first node 342A, a second node 346A and a third node 344A.

The input member 17 is continuously connected with the node 332A. The output member 19 is continuously connected with the node 344A.

The node 324A is continuously connected with node 336A via interconnecting member 370. The node 334A is continuously connected with the node 342A via interconnecting member 372. The node 326A is continuously connected with the node 346A via interconnecting member 374.

A first torque-transmitting device, such as brake 380, selectively connects the node 322A with the transmission housing 360. A second torque-transmitting device, such as brake 382, selectively connects the nodes 324A and 336A via interconnecting member 370 with the transmission housing 360. A third torque-transmitting device, such as brake 384, selectively connects the nodes 334A and 342 via interconnecting member 372 with the transmission housing 360. A fourth torque-transmitting device, such as clutch 385, selectively connects the nodes 326A, and 346A via interconnecting member 374 with the node 332A. A fifth torque-transmitting device, such as clutch 386, selectively connects the nodes 326A and 346 via interconnecting member 374 with the node 344A. A sixth torque-transmitting device, such as clutch 387, selectively connects the nodes 324A and 336A via interconnecting member 370 with the node 332A.

To establish ratios, two torque-transmitting devices are engaged for each gear state. The engaged torque-transmitting devices are represented by an "X" in each respective row of FIG. 3b. For example, to establish reverse gear, the brake 382 and clutch 386 are engaged. The brake 382 engages the nodes 324A and 336A with the transmission housing 360. The clutch 386 engages the nodes 326A and 346A with the node 344A. Likewise, the eight forward ratios are achieved through different combinations of clutch engagement as per FIG. 3b.

Description of a Fourth Exemplary Embodiment

Figure 4C:
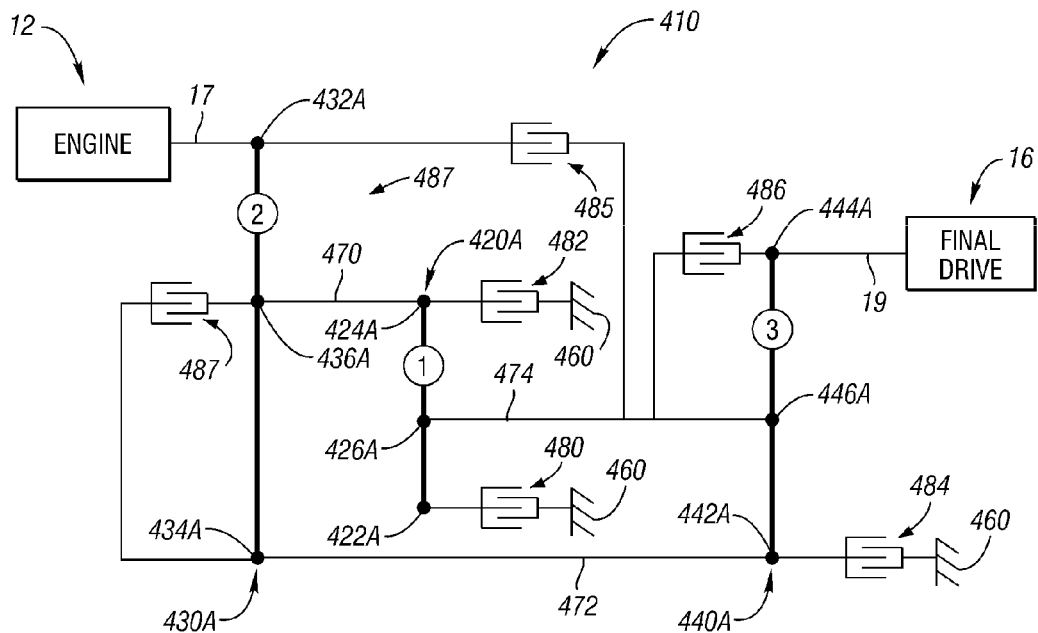
FIG. 4c is a schematic representation of the powertrain of FIG. 4a depicted in lever diagram form.
Figures 4A, 4B:
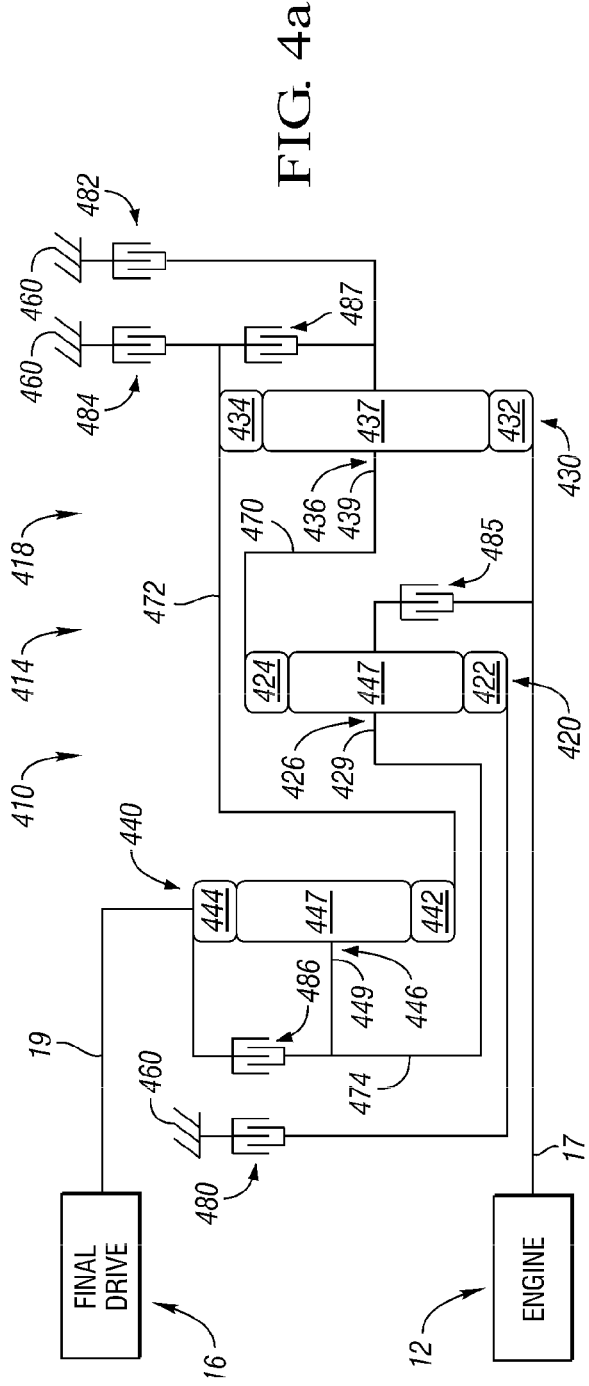

In FIG. 4a a powertrain 410 is shown having a conventional engine and torque converter 12, a planetary transmission 414, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 414 includes an input member 17 continuously connected with the engine 12, a planetary gear arrangement 418, and an output member 19 continuously connected with the final drive mechanism 16. The planetary gear arrangement 418 includes three planetary gear sets 420, 430 and 440.

The planetary gear set 420 includes a sun gear member 422, a ring gear member 424, and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear members 432 and the ring gear member 434.

The planetary gear set 440 includes a sun gear member 442, a ring gear member 444, and a planet carrier assembly member 446. The planet carrier assembly member 446 includes a plurality of pinion gears 447 mounted on a carrier member 449 and disposed in meshing relationship with both the ring gear member 444 and the sun gear member 442.

The planetary gear arrangement also includes six torque-transmitting devices 480, 482, 484, 485, 486 and 487. The torque-transmitting devices 480, 482 and 484 are stationary-type torque-transmitting devices, commonly termed brakes or reaction clutches. The torque-transmitting devices 485, 486 and 487 are rotating-type torque-transmitting devices, commonly termed clutches.

The input member 17 is continuously connected with the sun gear member 432 of the planetary gear set 430. The output member 19 is continuously connected with the ring gear member 444 of the planetary gear set 440.

A first interconnecting member 470 continuously connects the ring gear member 424 of the planetary gear set 420 with the planet carrier assembly member 436 of the planetary gear set 430. A second interconnecting member 472 continuously connects the ring gear member 434 of the planetary gear set 430 with the sun gear member 442 of the planetary gear set 440. A third interconnecting member 474 continuously connects the planet carrier assembly member 426 of the planetary gear set 420 with the planet carrier assembly member 446 of the planetary gear set 440.

A first torque-transmitting device, such as brake 480, selectively connects the sun gear member 422 of the planetary gear set 420 with the transmission housing 460. A second torque-transmitting device, such as a brake 482, selectively connects the ring gear member 424 of the planetary gear set 420 and planet carrier assembly member 436 of the planetary gear set 430 with the transmission housing 460. A third torque-transmitting device, such as brake 484, selectively connects the ring gear member 434 of the planetary gear set 430 and sun gear member 442 of the planetary gear set 440 via interconnecting member 472 with the transmission housing 460. A fourth torque-transmitting device, such as clutch 485, selectively connects the planet carrier assembly member 426 of the planetary gear set 420 and planet carrier assembly member 446 of the planetary gear set 440 via interconnecting member 474 with the sun gear member 432 of the planetary gear set 430. A fifth torque-transmitting device, such as clutch 486, selectively connects the planet carrier assembly member 426 of the planetary gear set 420 and planet carrier assembly member 446 of the planetary gear set 440 via interconnecting member 474 with the ring gear member 444 of the planetary gear set 440. A sixth torque-transmitting device, such as clutch 487, selectively connects the ring gear member 424 of the planetary gear set 420 and planet carrier assembly member 436 of the planetary gear set 430 via interconnecting member 470 with the ring gear member 434 of the planetary gear set 430 and sun gear member 442 of the planetary gear set 440 via interconnecting member 472.

As shown in FIG. 4b, and in particular the truth table disclosed therein, the torque-transmitting devices are selectively engaged in combinations of two to provide eight forward speed ratios and one reverse speed ratio, all with single transition sequential shifts with two overdrive ratios.

As set forth above, the engagement schedule for the torque-transmitting devices is shown in the truth table of FIG. 4b. The chart of FIG. 4b describes the ratio steps that are attained in the above described transmission. For example, the step ratio between the first and second forward speed ratios is 1.62, while the step ratio between the reverse speed ratio and first forward ratio is −0.38.

Referring to FIG. 4c, the embodiment of powertrain 410 depicted in FIG. 4a is illustrated in a lever diagram format. The powertrain 410 includes an input member 17 continuously connected with the engine 12, an output member 19 continuously connected with the final drive mechanism 16, a first planetary gear set 420A having three nodes: a first node 422A, a second node 426A and a third node 424A; a second planetary gear set 430A having three nodes: a first node 432A, a second node 436A and a third node 434A; and a third planetary gear set 440A having three nodes: a first node 442A, a second node 446A and a third node 444A.

The input member 17 is continuously connected with the node 432A. The output member 19 is continuously connected with the node 444A.

The node 424A is continuously connected with node 436A via interconnecting member 470. The node 434A is continuously connected with the node 442A via interconnecting member 472. The node 426A is continuously connected with the node 446A via interconnecting member 474.

A first torque-transmitting device, such as brake 480, selectively connects the node 422A with the transmission housing 460. A second torque-transmitting device, such as brake 482, selectively connects the nodes 424A and 436A via interconnecting member 470 with the transmission housing 460. A third torque-transmitting device, such as brake 484, selectively connects the nodes 434A and 442A via interconnecting member 472 with the transmission housing 460. A fourth torque-transmitting device, such as clutch 485, selectively connects the nodes 426A and 446A via interconnecting member 474 with the node 432A. A fifth torque-transmitting device, such as clutch 486, selectively connects the nodes 426A and 446A via interconnecting member 474 with the node 444A. A sixth torque-transmitting device, such as clutch 487, selectively connects the nodes 424A and 436A via interconnecting member 470 with the nodes 434A and 442A via interconnecting member 472.

To establish ratios, two torque-transmitting devices are engaged for each gear state. The engaged torque-transmitting devices are represented by an "X" in each respective row of FIG. 4b. For example, to establish reverse gear, the brake 482 and clutch 486 are engaged. The brake 482 engages the nodes 436A and 424A with the transmission housing 460. The clutch 486 engages the nodes 426A and 446A with the node 444A. Likewise, the eight forward ratios are achieved through different combinations of clutch engagement as per FIG. 4b.

Description of a Fifth Exemplary Embodiment

Figures 5A, 5B:
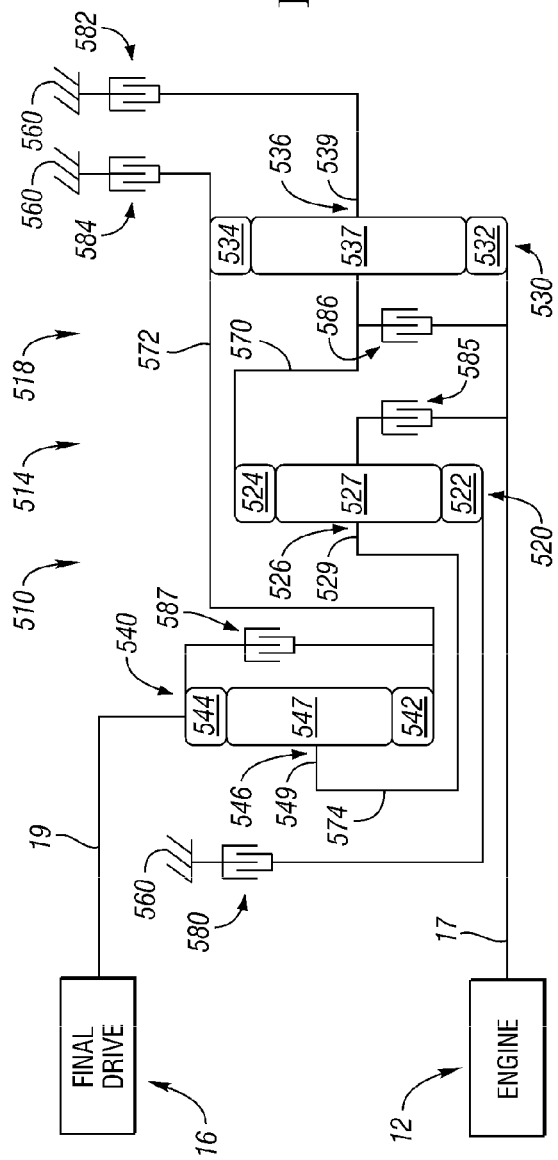

In FIG. 5a a powertrain 510 is shown having a conventional engine and torque converter 12, a planetary transmission 514, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 514 includes an input member 17 continuously connected with the engine 12, a planetary gear arrangement 518, and an output member 19 continuously connected with the final drive mechanism 16. The planetary gear arrangement 218 includes three planetary gear sets 520, 530 and 540.

The planetary gear set 520 includes a sun gear member 522, a ring gear member 524, and a planet carrier assembly member 526. The planet carrier assembly member 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear members 532 and the ring gear member 534.

The planetary gear set 540 includes a sun gear member 542, a ring gear member 544, and a planet carrier assembly member 546. The planet carrier assembly member 546 includes a plurality of pinion gears 547 mounted on a carrier member 549 and disposed in meshing relationship with both the ring gear member 544 and the sun gear member 5.

The planetary gear arrangement also includes six torque-transmitting devices 580, 582, 584, 585, 586 and 587. The torque-transmitting devices 580, 582 and 584 are stationary-type torque-transmitting devices, commonly termed brakes or reaction clutches. The torque-transmitting devices 585, 586 and 587 are rotating-type torque-transmitting devices, commonly termed clutches.

The input member 17 is continuously connected with the sun gear member 532 of the planetary gear set 530. The output member 19 is continuously connected with the ring gear member 544 of the planetary gear set 540.

A first interconnecting member 570 continuously connects the ring gear member 524 of the planetary gear set 520 with the planet carrier assembly member 536 of the planetary gear set 530. A second interconnecting member 572 continuously connects the ring gear member 534 of the planetary gear set 530 with the sun gear member 542 of the planetary gear set 540. A third interconnecting member 574 continuously connects the planet carrier assembly member 526 of the planetary gear set 520 with the planet carrier assembly member 546 of the planetary gear set 540.

A first torque-transmitting device, such as brake 580, selectively connects the sun gear member 522 of the planetary gear set 520 with the transmission housing 560. A second torque-transmitting device, such as brake 582, selectively connects the ring gear member 524 of the planetary gear set 520 and the planet carrier assembly member 536 of the planetary gear set 530 via interconnecting member 570 with the transmission housing 560. A third torque-transmitting device, such as brake 584, selectively connects the ring gear member 534 of the planetary gear set 530 and the sun gear member 542 of the planetary gear set 540 via interconnecting member 572 with the transmission housing 560. A fourth torque-transmitting device, such as clutch 585, selectively connects the planet carrier assembly member 526 of the planetary gear set 520 and planet carrier assembly member 546 of the planetary gear set 540 via interconnecting member 574 with the sun gear member 532 of the planetary gear set 530. A fifth torque-transmitting device, such as clutch 586, selectively connects the ring gear member 524 of the planetary gear set 520 and the planet carrier assembly member 536 of the planetary gear set 530 via interconnecting member 570 with the sun gear member 532 of the planetary gear set 530. A sixth torque-transmitting device, such as clutch 587, selectively connects the ring gear member 534 of the planetary gear set 530 and sun gear member 542 of the planetary gear set 540 via interconnecting member 572 with the ring gear member 544 of the planetary gear set 540.

As shown in FIG. 5b, and in particular the truth table disclosed therein, the torque-transmitting devices are selectively engaged in combinations of two to provide eight forward speed ratios and one reverse speed ratio, all with single transition sequential shifts and having two overdrive ratios.

As set forth above, the engagement schedule for the torque-transmitting devices is shown in the truth table of FIG. 5b. The chart of FIG. 5b describes the ratio steps that are attained in the above described transmission. For example, the step ratio between the first and second forward speed ratios is 1.62, while the step ratio between the reverse speed ratio and first forward ratio is −0.38.

Figure 5C:
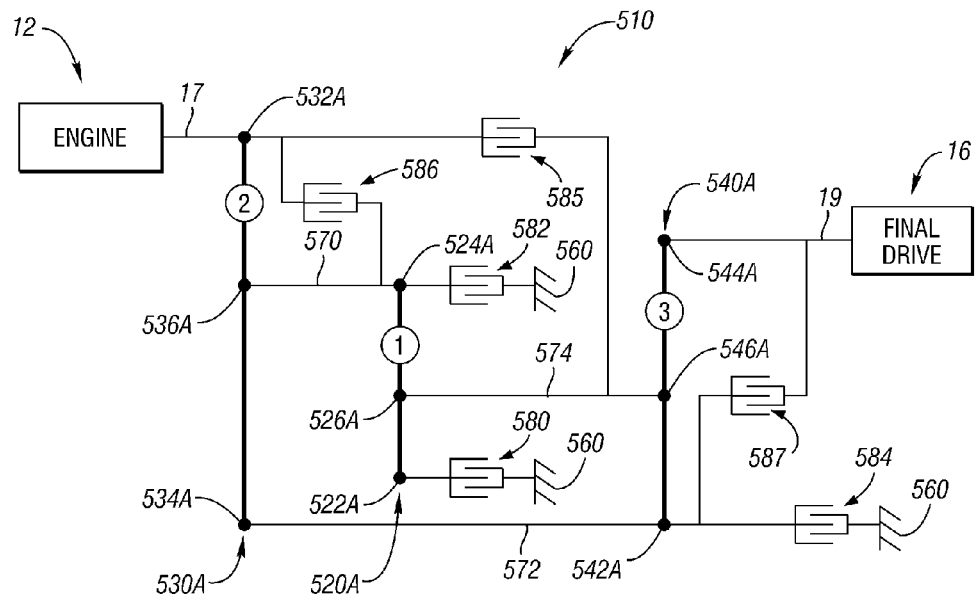
FIG. 5c is a schematic representation of the powertrain of FIG. 5a depicted in lever diagram form.

Referring to FIG. 5c, the embodiment of powertrain 510 depicted in FIG. 5a is illustrated in a lever diagram format. The powertrain 510 includes an input member 17 continuously connected with the engine 12, an output member 19 continuously connected with the final drive mechanism 16, a first planetary gear set 520A having three nodes: a first node 522A, a second node 526A and a third node 524A; a second planetary gear set 530A having three nodes: a first node 532A, a second node 536A and a third node 534A; and a third planetary gear set 540A having three nodes: a first node 542A, a second node 546A and a third node 544A.

The input member 17 is continuously connected with the node 532A. The output member 19 is continuously connected with the node 544A.

The node 524A is continuously connected with node 536A via interconnecting member 570. The node 534A is continuously connected with the node 542A via interconnecting member 572. The node 526A is continuously connected with the node 546A via interconnecting member 574.

A first torque-transmitting device, such as brake 580, selectively connects the node 522A with the transmission housing 560. A second torque-transmitting device, such as brake 582, selectively connects the nodes 524A and 536A via interconnecting member 570 with the transmission housing 560. A third torque-transmitting device, such as brake 584, selectively connects the nodes 534A and 542A via interconnecting member 572 with the transmission housing 560. A fourth torque-transmitting device, such as clutch 585, selectively connects the nodes 526A and 546A via interconnecting member 574 with the node 532A. A fifth torque-transmitting device, such as clutch 586, selectively connects the nodes 524A and 536A via interconnecting member 570 with the node 532A. A sixth torque-transmitting device, such as clutch 587, selectively connects the nodes 534A and 542A via interconnecting member 572 with node 544A.

To establish ratios, two torque-transmitting devices are engaged for each gear state. The engaged torque-transmitting devices are represented by an "X" in each respective row of FIG. 5b. For example, to establish reverse gear, the brake 582 and clutch 587 are engaged. The brake 582 engages the nodes 524A and 536A with the transmission housing 560. The clutch 587 engages the nodes 534A and 542A with the node 544A. Likewise, the eight forward ratios are achieved through different combinations of clutch engagement as per FIG. 5b.

Description of a Sixth Exemplary Embodiment

In FIG. 6a a powertrain 610 is shown having a conventional engine and torque converter 12, a planetary transmission 614, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 614 includes an input member 17 continuously connected with the engine 12, a planetary gear arrangement 618, and an output member 19 continuously connected with the final drive mechanism 16. The planetary gear arrangement 618 includes three planetary gear sets 620, 630 and 640.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear members 632 and the ring gear member 634.

The planetary gear set 640 includes a sun gear member 642, a ring gear member 644, and a planet carrier assembly member 646. The planet carrier assembly member 646 includes a plurality of pinion gears 647 mounted on a carrier member 649 and disposed in meshing relationship with both the ring gear member 644 and the sun gear member 642.

The planetary gear arrangement also includes six torque-transmitting devices 680, 682, 684, 685, 686 and 687. The torque-transmitting devices 680, 682 and 684 are stationary-type torque-transmitting devices, commonly termed brakes or reaction clutches. The torque-transmitting devices 685, 686 and 687 are rotating-type torque-transmitting devices, commonly termed clutches.

The input member 17 is continuously connected with the sun gear member 632 of the planetary gear set 630. The output member 19 is continuously connected with the ring gear member 644 of the planetary gear set 640.

A first interconnecting member 670 continuously connects the ring gear member 624 of the planetary gear set 620 with the planet carrier assembly member 636 of the planetary gear set 630. A second interconnecting member 672 continuously connects the ring gear member 634 of the planetary gear set 630 with the sun gear member 642 of the planetary gear set 640. A third interconnecting member 674 continuously connects the planet carrier assembly member 626 of the planetary gear set 620 with the planet carrier assembly member 646 of the planetary gear set 640.

A first torque-transmitting device, such as brake 680, selectively connects the sun gear member 622 of the planetary gear set 620 with the transmission housing 660. A second torque-transmitting device, such as brake 682, selectively connects the ring gear member 624 of the planetary gear set 620 and planet carrier assembly member 636 of the planetary gear set 630 via interconnecting member 670 with the transmission housing 660. A third torque-transmitting device, such as brake 684, selectively connects the ring gear member 634 of the planetary gear set 630 and sun gear member 642 of the planetary gear set 640 via interconnecting member 672 with the transmission housing 660. A fourth torque-transmitting device, such as clutch 685, selectively connects the planet carrier assembly member 626 of the planetary gear set 620 and planet carrier assembly member 646 of the planetary gear set 640 via interconnecting member 674 with the sun gear member 632 of the planetary gear set 620. A fifth torque-transmitting device, such as clutch 686, selectively connects the ring gear member 624 of the planetary gear set 620 and planet carrier assembly member 636 of the planetary gear set 630 via interconnecting member 670 with the ring gear member 634 of the planetary gear set 630 and sun gear member 642 of the planetary gear set 640 via interconnecting member 672. A sixth torque-transmitting device, such as clutch 687, selectively connects the ring gear member 634 of the planetary gear set 630 and sun gear member 642 of the planetary gear set 640 via interconnecting member 672 with the ring gear member 644 of the planetary gear set 640.

As shown in FIG. 6b, and in particular the truth table disclosed therein, the torque-transmitting devices are selectively engaged in combinations of two to provide eight forward speed ratios and one reverse speed ratio, all with single transition sequential shifts and having two overdrive ratios.

As set forth above, the engagement schedule for the torque-transmitting devices is shown in the truth table of FIG. 6b. The chart of FIG. 6b describes the ratio steps that are attained in the above described transmission. For example, the step ratio between the first and second forward speed ratios is 1.53, while the step ratio between the reverse speed ratio and first forward ratio is −0.42.

Figure 6C:
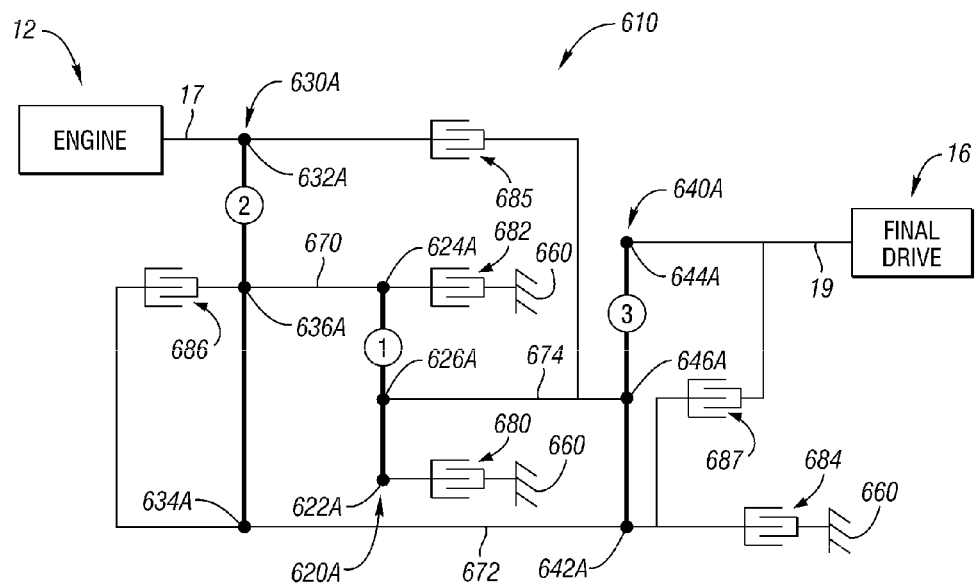
FIG. 6c is a schematic representation of the powertrain of FIG. 6a depicted in lever diagram form.

Referring to FIG. 6c, the embodiment of powertrain 610 depicted in FIG. 6a is illustrated in a lever diagram format. The powertrain 610 includes an input member 17 continuously connected with the engine 12, an output member 19 continuously connected with the final drive mechanism 16, a first planetary gear set 620A having three nodes: a first node 622A, a second node 626A and a third node 624A; a second planetary gear set 630A having three nodes: a first node 632A, a second node 636A and a third node 634A; and a third planetary gear set 640A having three nodes: a first node 642A, a second node 646A and a third node 644A.

The input member 17 is continuously connected with the node 632A. The output member 19 is continuously connected with the node 644A.

The node 624A is continuously connected with node 636A via interconnecting member 670. The node 634A is continuously connected with the node 642A via interconnecting member 672. The node 626A is continuously connected with the node 646A via interconnecting member 674.

A first torque-transmitting device, such as brake 680, selectively connects the node 622A with the transmission housing 660. A second torque-transmitting device, such as brake 682, selectively connects the nodes 624A and 636A via interconnecting member 670 with the transmission housing 660. A third torque-transmitting device, such as brake 684, selectively connects the nodes 634A and 642A via interconnecting member 672 with the transmission housing 660. A fourth torque-transmitting device, such as clutch 685, selectively connects the nodes 626A and 646A via interconnecting member 674 with the node 632A. A fifth torque-transmitting device, such as clutch 686, selectively connects the nodes 624A and 636A via interconnecting member 670 with the nodes 634A and 642A via interconnecting member 672. A sixth torque-transmitting device, such as clutch 687, selectively connects the nodes 634A and 642A via interconnecting member 672 with the node 644A.

To establish ratios, two torque-transmitting devices are engaged for each gear state. The engaged torque-transmitting devices are represented by an "X" in each respective row of FIG. 6b. For example, to establish reverse gear, the brake 682 and clutch 687 are engaged. The brake 682 engages the nodes 624A and 636A with the transmission housing 660. The clutch 687 engages the nodes 634A and 642A with the nod 644A. Likewise, the eight forward ratios are achieved through different combinations of clutch engagement as per FIG. 6b.

Description of a Seventh Exemplary Embodiment

Figures 7A, 7B:
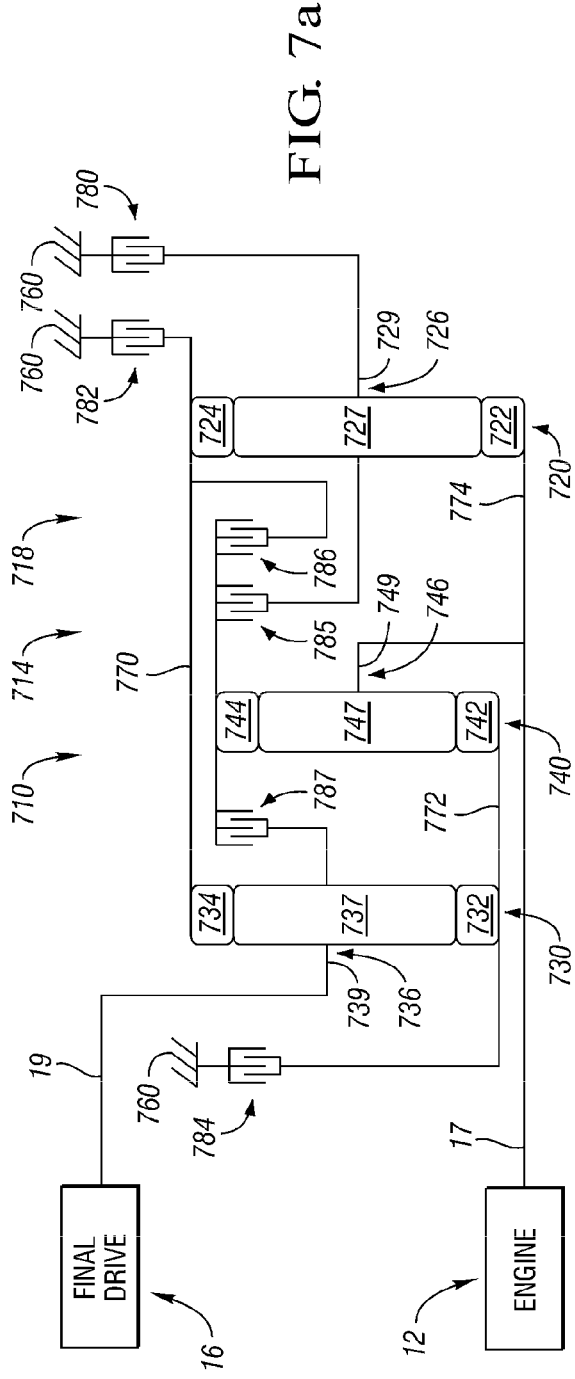

In FIG. 7a a powertrain 710 is shown having a conventional engine and torque converter 12, a planetary transmission 714, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 714 includes an input member 17 continuously connected with the engine 12, a planetary gear arrangement 718, and an output member 19 continuously connected with the final drive mechanism 16. The planetary gear arrangement 718 includes three planetary gear sets 720, 730 and 740.

The planetary gear set 720 includes a sun gear member 722, a ring gear member 724, and a planet carrier assembly member 726. The planet carrier assembly member 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear members 732 and the ring gear member 734.

The planetary gear set 740 includes a sun gear member 742, a ring gear member 744, and a planet carrier assembly member 746. The planet carrier assembly member 746 includes a plurality of pinion gears 747 mounted on a carrier member 749 and disposed in meshing relationship with both the ring gear member 744 and the sun gear member 742.

The planetary gear arrangement also includes six torque-transmitting devices 780, 782, 784, 785, 786 and 787. The torque-transmitting devices 780, 782 and 784 are stationary-type torque-transmitting devices, commonly termed brakes or reaction clutches. The torque-transmitting devices 785, 786 and 787 are rotating-type torque-transmitting devices, commonly termed clutches.

The input member 17 is continuously connected with the sun gear member 722 of the planetary gear set 720. The output member 19 is continuously connected with the planet carrier assembly member 736 of the planetary gear set 730.

A first interconnecting member 770 continuously connects the ring gear member 724 of the planetary gear set 720 with the ring gear member 734 of the planetary gear set 730. A second interconnecting member 772 continuously connects the sun gear member 732 of the planetary gear set 730 with the sun gear member 742 of the planetary gear set 740. A third interconnecting member 774 continuously connects the sun gear member 722 of the planetary gear set 720 with the planet carrier assembly member 746 of the planetary gear set 740.

A first torque-transmitting device, such as brake 780, selectively connects the planet carrier assembly member 726 of the planetary gear set 720 with the transmission housing 760. A second torque-transmitting device, such as brake 782, selectively connects the ring gear member 724 of the planetary gear set 720 and the ring gear member 734 of the planetary gear set 730 via interconnecting member 770 with the transmission housing 760. A third torque-transmitting device, such as brake 784, selectively connects the sun gear member 732 of the planetary gear set 730 and the sun gear member 742 of the planetary gear set 740 via interconnecting member 772 with the transmission housing 760. A fourth torque-transmitting device, such as clutch 785, selectively connects the planet carrier assembly member 726 of the planetary gear set 720 with the ring gear member 744 of the planetary gear set 740. A fifth torque-transmitting device, such as clutch 786, selectively connects the ring gear member 724 of the planetary gear set 720 and the ring gear member 734 of the planetary gear set 730 via interconnecting member 770 with the ring gear member 744 of the planetary gear set 740. A sixth torque-transmitting device, such as clutch 787, selectively connects the planet carrier assembly member 736 of the planetary gear set 730 with the ring gear member 744 of the planetary gear set 740.

As shown in FIG. 7b, and in particular the truth table disclosed therein, the torque-transmitting devices are selectively engaged in combinations of two to provide eight forward speed ratios and one reverse speed ratio, all with single transition sequential shifts with three overdrive ratios.

As set forth above, the engagement schedule for the torque-transmitting devices is shown in the truth table of FIG. 7b. The chart of FIG. 7b describes the ratio steps that are attained in the above described transmission. For example, the step ratio between the first and second forward speed ratios is 1.48, while the step ratio between the reverse speed ratio and first forward ratio is −0.56.

Figure 7C:
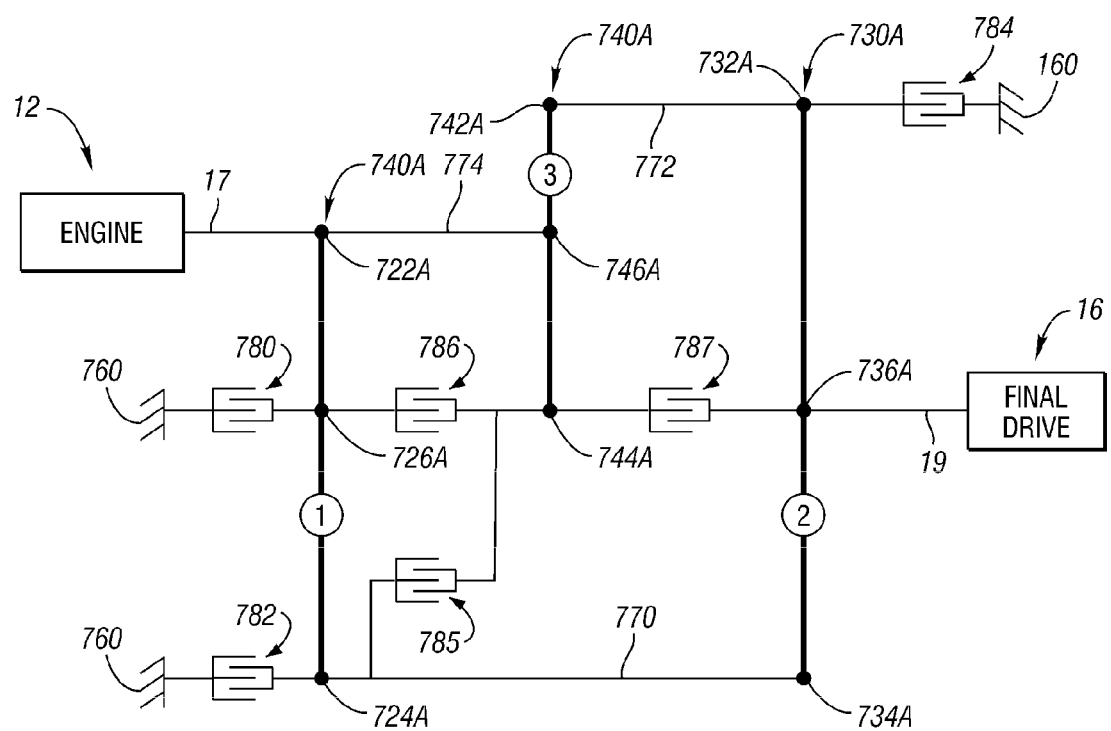
FIG. 7c is a schematic representation of the powertrain of FIG. 7a depicted in lever diagram form.

Referring to FIG. 7c, the embodiment of powertrain 710 depicted in FIG. 7a is illustrated in a lever diagram format. The powertrain 710 includes an input member 17 continuously connected with the engine 12, an output member 19 continuously connected with the final drive mechanism 16, a first planetary gear set 720A having three nodes: a first node 722A, a second node 726A and a third node 724A; a second planetary gear set 730A having three nodes: a first node 732A, a second node 736A and a third node 734A; and a third planetary gear set 740A having three nodes: a first node 742A, a second node 746A and a third node 744A.

The input member 17 is continuously connected with the node 722A. The output member 19 is continuously connected with the node 736A.

The node 724A is continuously connected with node 734A via interconnecting member 770. The node 732A is continuously connected with the node 742A via interconnecting member 772. The node 722A is continuously connected with the node 746A via interconnecting member 774.

A first torque-transmitting device, such as brake 780, selectively connects the node 726A with the transmission housing 760. A second torque-transmitting device, such as brake 782, selectively connects the nodes 724A and 734A via interconnecting member 770 with the transmission housing 760. A third torque-transmitting device, such as brake 784, selectively connects the nodes 732A and 742A via interconnecting member 772 with the transmission housing 760. A fourth torque-transmitting device, such as clutch 785, selectively connects the nodes 724A and 734A via interconnecting member 770 with the node 744A. A fifth torque-transmitting device, such as clutch 786, selectively connects the node 726A with the node 744A. A sixth torque-transmitting device, such as clutch 787, selectively connects the node 736A with the node 744A.

To establish ratios, two torque-transmitting devices are engaged for each gear state. The engaged torque-transmitting devices are represented by an "X" in each respective row of FIG. 7b. For example, to establish reverse gear, the brakes 780 and 784 are engaged. The brake 780 engages the node 726A with the transmission housing 760. The brake 784 engages the nodes 732A and 742A with the transmission housing 760. Likewise, the eight forward ratios are achieved through different combinations of clutch engagement as per FIG. 7b.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member;
an output member;
first, second and third planetary gear sets each having first, second and third member;
said input member being continuously connected with said first member of said first or second planetary gear set;
said output member being continuously connected with said second member of said second planetary gear set or with said third member of said third planetary gear set;
a first interconnecting member continuously connecting said third member of said first planetary gear set with said second or said third member of said second planetary gear set;
a second interconnecting member continuously connecting said first member of said third planetary gear set with said first or third member of said second planetary gear set;
a third interconnecting member continuously connecting said second member of said third planetary gear set with said first or second member of said first planetary gear set;
six torque-transmitting devices being engaged in combinations of two to establish at least eight forward speed ratios and at least one reverse speed ratio between said input member and said output member; wherein a first of said six torque-transmitting devices selectively connects said first or second member of said first planetary gear set with a stationary member;
wherein a second of said six torque-transmitting devices selectively connects said third member of said first planetary gear set with said stationary member;
wherein a third of said six torque-transmitting devices selectively connects said first or third member of said second planetary gear set with said stationary member; and
wherein a fourth of said six torque-transmitting devices selectively connects said second member of said first planetary gear set with said first member of said second planetary gear set or with said third member of said third planetary gear set.

2. The transmission of claim 1, wherein a fifth of said six torque-transmitting devices selectively connects said second or third member of said first planetary gear set with said first or third member of said second planetary gear set or with said third member of said third planetary gear set.

3. The transmission of claim 2, wherein a sixth of said six torque-transmitting devices selectively connects a member of said second planetary gear set with said third member of said first or third planetary gear set.

4. The transmission of claim 3, wherein said first, second and third members of said first, second and third planetary gear sets comprise a sun gear member, a planet carrier assembly member and a ring gear member, respectively.

5. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;
said fourth of said six torque-transmitting devices selectively connects said second member of said first planetary gear set with said first member of said second planetary gear set;
a fifth of said six torque-transmitting devices selectively connects said second member of said first planetary gear set with said third member of said second planetary gear set; and
a sixth of said six torque-transmitting devices selectively connects said third member of said first planetary gear set with said first member of said second planetary gear set.

6. The transmission of claim 5, wherein said first, second and third members of said first, second and third planetary gear sets comprise a sun gear member, a planet carrier assembly member and a ring gear member, respectively.

7. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;
said fourth of said six torque-transmitting devices selectively connects said second member of said first planetary gear set with said first member of said second planetary gear set;
a fifth of said six torque-transmitting devices selectively connects said second member of said first planetary gear set with said third member of said second planetary gear set; and
a sixth of said six torque-transmitting devices selectively connects said third member of said first planetary gear set with said third member of said second planetary gear set.

8. The transmission of claim 7, wherein said first, second and third members of said first, second and third planetary gear sets comprise a sun gear member, a planet carrier assembly member and a ring gear member, respectively.

9. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;
said fourth of said six torque-transmitting devices selectively connects said second member of said first planetary gear set with said first member of said second planetary gear set;
a fifth of said six torque-transmitting devices selectively connects said second member of said first planetary gear set with said third member of said third planetary gear set; and
a sixth of said six torque-transmitting devices selectively connects said third member of said first planetary gear set with said first member of said second planetary gear set.

10. The transmission of claim 9, wherein said first, second and third members of said first, second and third planetary gear sets comprise a sun gear member, a planet carrier assembly member and a ring gear member, respectively.

11. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;
said fourth of said six torque-transmitting devices selectively connects said second member of said first planetary gear set with said first member of said second planetary gear set;
a fifth of said six torque-transmitting devices selectively connects said second member of said first planetary gear set with said third member of said third planetary gear set; and
a sixth of said six torque-transmitting devices selectively connects said third member of said first planetary gear set with said third member of said second planetary gear set.

12. The transmission of claim 11, wherein said first, second and third members of said first, second and third planetary gear sets comprise a sun gear member, a planet carrier assembly member and a ring gear member, respectively.

13. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;
said fourth of said six torque-transmitting devices selectively connects said second member of said first planetary gear set with said first member of said second planetary gear set;
a fifth of said six torque-transmitting devices selectively connects said third member of said first planetary gear set with said first member of said second planetary gear set; and
a sixth of said six torque-transmitting devices selectively connects said third member of said third planetary gear set with said third member of said second planetary gear set.

14. The transmission of claim 13, wherein said first, second and third members of said first, second and third planetary gear sets comprise a sun gear member, a planet carrier assembly member and a ring gear member, respectively.

15. The transmission of claim 1, wherein
said input member is continuously connected with said first member of said second planetary gear set;
said output member is continuously connected with said third member of said third planetary gear set;
said first interconnecting member continuously connects said third member of said first planetary gear set with said second member of said second planetary gear set;
said second interconnecting member continuously connects said third member of said second planetary gear set with said first member of said third planetary gear set;
said third interconnecting member continuously connects said second member of said first planetary gear set with said second member of said third planetary gear set;
said first of said six torque-transmitting devices selectively connects said first member of said first planetary gear set with said stationary member;
said third of said six torque-transmitting devices selectively connects said third member of said second planetary gear set with said stationary member;

said fourth of said six torque-transmitting devices selectively connects said second member of said first planetary gear set with said first member of said second planetary gear set;
a fifth of said six torque-transmitting devices selectively connects said third member of said first planetary gear set with said third member of said second planetary gear set; and
a sixth of said six torque-transmitting devices selectively connects said third member of said third planetary gear set with said third member of said second planetary gear set.

16. The transmission of claim 15, wherein said first, second and third members of said first, second and third planetary gear sets comprise a sun gear member, a planet carrier assembly member and a ring gear member, respectively.

17. The transmission of claim 1, wherein
said input member is continuously connected with said first member of said first planetary gear set;
said output member is continuously connected with said second member of said second planetary gear set;
said first interconnecting member continuously connects said third member of said first planetary gear set with said third member of said second planetary gear set;
said second interconnecting member continuously connects said first member of said second planetary gear set with said first member of said third planetary gear set;
said third interconnecting member continuously connects said first member of said first planetary gear set with said second member of said third planetary gear set;
said first of said six torque-transmitting devices selectively connects said second member of said first planetary gear set with said stationary member;
said third of said six torque-transmitting devices selectively connects said first member of said second planetary gear set with said stationary member;
said fourth of said six torque-transmitting devices selectively connects said second member of said first planetary gear set with said third member of said third planetary gear set;
a fifth of said six torque-transmitting devices selectively connects said third member of said first planetary gear set with said third member of said third planetary gear set; and
a sixth of said six torque-transmitting devices selectively connects said second member of said second planetary gear set with said third member of said third planetary gear set.

18. A multi-speed transmission comprising:
an input member;
an output member;
first, second and third planetary gear sets each having first, second and third member;
said input member being continuously connected with said first member of said first or second planetary gear set;
said output member being continuously connected with said second member of said second planetary gear set or with said third member of said third planetary gear set;
a first interconnecting member continuously connecting said third member of said first planetary gear set with said second or said third member of said second planetary gear set;
a second interconnecting member continuously connecting said first member of said third planetary gear set with said first or third member of said second planetary gear set;
a third interconnecting member continuously connecting said second member of said third planetary gear set with said first or second member of said first planetary gear set; and
only six torque-transmitting devices being engaged in combinations of two to establish at least eight forward speed ratios and at least one reverse speed ratio between said input member and said output member.

19. A multi-speed transmission comprising:
an input member;
an output member;
first, second and third planetary gear sets each having first, second and third member;
said input member being continuously connected with said first member of said first or second planetary gear set;
said output member being continuously connected with said second member of said second planetary gear set or with said third member of said third planetary gear set;
a first interconnecting member continuously connecting said third member of said first planetary gear set with said second or said third member of said second planetary gear set;
a second interconnecting member continuously connecting said first member of said third planetary gear set with said first or third member of said second planetary gear set;
a third interconnecting member continuously connecting said second member of said third planetary gear set with said first or second member of said first planetary gear set; and
only six torque-transmitting devices being engaged in combinations of two to establish at least eight forward speed ratios and at least one reverse speed ratio between said input member and said output member; wherein said six torque-transmitting devices include only three clutches.

* * * * *